US009372966B2

United States Patent
Braun et al.

(10) Patent No.: US 9,372,966 B2
(45) Date of Patent: Jun. 21, 2016

(54) METHOD AND SYSTEM FOR RESOLVING A NAMING CONFLICT

(75) Inventors: Michael Braun, München (DE); Markus Dichtl, München (DE); Bernd Meyer, München (DE)

(73) Assignee: Siemens Aktiengesellschaft, Munich (DE)

( * ) Notice: Subject to any disclaimer, the term of this patent is extended or adjusted under 35 U.S.C. 154(b) by 505 days.

(21) Appl. No.: 13/508,621

(22) PCT Filed: Oct. 6, 2010

(86) PCT No.: PCT/EP2010/064946
§ 371 (c)(1),
(2), (4) Date: Sep. 4, 2012

(87) PCT Pub. No.: WO2011/054617
PCT Pub. Date: May 12, 2011

(65) Prior Publication Data
US 2012/0324219 A1    Dec. 20, 2012

(30) Foreign Application Priority Data
Nov. 9, 2009    (DE) .......................... 10 2009 052 457

(51) Int. Cl.
*G06F 21/12*    (2013.01)
*G06F 9/445*    (2006.01)

(52) U.S. Cl.
CPC .......... *G06F 21/125* (2013.01); *G06F 9/44552* (2013.01)

(58) Field of Classification Search
None
See application file for complete search history.

(56) References Cited

U.S. PATENT DOCUMENTS

| 7,117,371 | B1 | 10/2006 | Parthasarathy | |
|---|---|---|---|---|
| 7,152,223 | B1 * | 12/2006 | Brumme | G06F 8/41 717/116 |
| 2001/0025370 | A1 * | 9/2001 | Maruyama | G06F 9/468 717/106 |
| 2001/0056533 | A1 * | 12/2001 | Yianilos | G06F 21/10 713/153 |

(Continued)

FOREIGN PATENT DOCUMENTS

| CN | 1534518 | 10/2004 |
|---|---|---|
| WO | WO 02/31648 A2 | 4/2002 |

OTHER PUBLICATIONS

Chris Luer et al, "JPloy: User-Centric Deployment Support in a Component Platform", May 2004, Springer-Verlag.*

(Continued)

*Primary Examiner* — Lisa Lewis
*Assistant Examiner* — Henry Tsang
(74) *Attorney, Agent, or Firm* — Cozen O'Connor

(57) ABSTRACT

A method and a system for naming-conflict-free integration of software components originating from software component manufacturers (OEM), comprising software development devices from different software component manufacturers (OEM) that manufacture and encrypt software components with the respective cryptographic key, wherein when a naming conflict occurs during the integration of encrypted software components, at least one of the encrypted software components in which the naming conflict occurred is expanded by a naming conflict resolution rule to thereby allows for the resolution of naming conflicts in encrypted software components that can originate from different software component manufacturers without the source code of the software components becoming visible to third parties.

19 Claims, 1 Drawing Sheet

(56) References Cited

U.S. PATENT DOCUMENTS

| | | | |
|---|---|---|---|
| 2002/0199170 A1 | 12/2002 | Jameson | |
| 2004/0039926 A1* | 2/2004 | Lambert | G06F 21/125 713/189 |
| 2004/0193952 A1 | 9/2004 | Narayanan et al. | |
| 2007/0124409 A1* | 5/2007 | Sibert | G06F 12/145 709/216 |
| 2008/0183976 A1* | 7/2008 | Bliss | G05B 19/056 711/154 |
| 2009/0204583 A1* | 8/2009 | Hechler | G06F 17/3056 |

OTHER PUBLICATIONS

Luer et al, "JPloy: User-Centric Deployment Support in a Component Platform", May 2004, Springer-Verlag, pp. 190-204.*

Paul DuBois, "MySQL Cookbook", Oct. 2002, O'Reilly Media.*

Chris Lüer et al: "JPloy: User-Centric Deployment Support in a Component Platform", May 1, 2004, Component Deployment; [Lecture Notes in Computer Science;;LNCS] Springer-Verlag, Berlin/Heidelberg, pp. 190-204; Others.

Recipe 2.4. Preventing Name Collisions with Namespaces. In: D. Ryan Stephens, Christopher Diggins, Jonathan Turkanis, Jeff Cogswell: "C++Cookbook", [Online] Nov. 8, 2005, O'Reilly Media found on the internet on Dec. 8, 2010: URL://proquest.safaribooksonline.com/print?xmlid=0596007612/cplusp; Others.

"3.27 Generating Unique Table Names". In: Paul DuBois: "MySQL Cookbook", [Online] Oct. 28, 2002, O'Reilly Media; found on the internet on Dec. 8, 2010: URL:http://proquest,safaribooksonline.com/print?xmlid=0-596-00145-2/mys; Others.

Peter Hnitynka and Peter Tùma: "Fighting Class Name Clashes in Java Component Systems", Lectures Notes in Computer Science, Springer DE, vol. 2789, Jan. 1, 2003, pp. 106-109; Magazine.

Office Action dated Dec. 24, 2014 issued in the corresponding Chinese Patent Application No. 2010800507571.

* cited by examiner

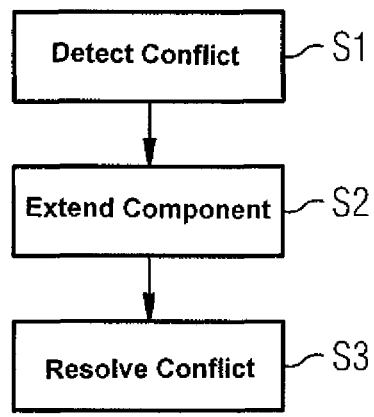
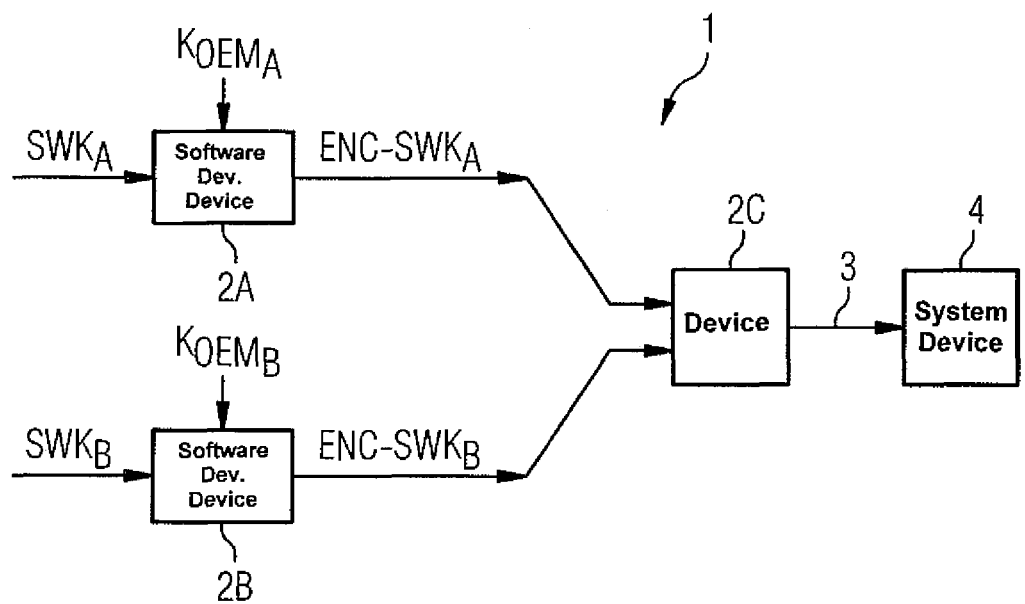

METHOD AND SYSTEM FOR RESOLVING A NAMING CONFLICT

CROSS-REFERENCE TO RELATED APPLICATIONS

This is a U.S. national stage of application No. PCT/EP2010/064946 filed 06 Oct. 2010. Priority is claimed on German Application No. 10 2009 052 457.6 filed 9 Nov. 2009, the content of which is incorporated herein by reference in its entirety.

BACKGROUND OF THE INVENTION

1. Field of the Invention

The invention relates to encryption and, more particularly to, a method for resolving a naming conflict in encrypted software components and a system for naming-conflict-free integration of software components which may originate from different software component manufacturers Original Equipment Manufacturers (OEM).

2. Description of the Related Art

When using encrypted software or software components, naming conflicts can occur. As the corresponding software components are present only in encrypted form, naming conflicts of this kind cannot be readily resolved in conventional systems. For example, if a software component or software package is generated or produced by different software component manufacturers OEM and then encrypted, a naming conflict cannot be removed during subsequent integration of the software components. If, for example, the two software packages invoke particular functions under the same function name which, however, designate different sub-programs or subroutines in the two software components, a naming conflict is present. As the user of the two software packages or software components does not have access to the source code in unencrypted form, he cannot resolve the naming conflict.

SUMMARY OF THE INVENTION

It is therefore an object of the invention to provide a method and a system for resolving a naming conflict in encrypted software components.

This and other objects and advantages are achieved in accordance with the invention by providing a method for resolving a naming conflict in encrypted software components comprising (a) detecting a naming conflict in the encrypted software components (ENC-SWK), (b) extending one of the encrypted software components (ENC-SWK) in which a naming conflict is detected to include a naming conflict resolution rule for resolving the naming conflict, and (c) resolving the naming conflict after transmission of the encrypted software components to a destination system device and after decryption thereof on the destination system device in accordance with the co-transmitted naming conflict resolution rule.

In an embodiment of the method in accordance with the invention, a naming conflict between two encrypted software components is detected if the software components have at least one identical name for function calls, constants, variables, data types or other data objects of different functions, constants, variables, data types or other objects.

In an embodiment of the method in accordance with the invention, a naming conflict between encrypted software components is detected using unencrypted header data of the respective encrypted software components.

In an alternative embodiment of the method in accordance with the invention, a naming conflict between encrypted software components is detected based on tables of the names used in the encrypted software components for software component calls, constants, variables, data types or objects.

In another embodiment of the method in accordance with the invention, the name causing the naming conflict is replaced by a substitute name in one of the two software components after decryption thereof for all the function calls and accesses contained in the software component which use that name to resolve a naming conflict between two encrypted software components.

In a further embodiment of the method in accordance with the invention, the substitute name is contained in the co-transmitted naming conflict resolution rule.

In an alternative embodiment, the substitute name is generated in the destination system device.

In another embodiment, the substitute name comprises a generated random number or a count value.

In still a further embodiment, a name for a function call, a constant, a variable, a data type or another object of another software component comprises a sequence of characters, letters and numbers.

In another embodiment, a developed software component is encrypted using a hybrid cryptographic method using a public key.

In a further embodiment of the method, the encrypted software component is decrypted using a hybrid cryptographic method using a private key which is incorporated in the destination system device.

In an embodiment of the method in accordance with the invention, the public key and the private key are generated as a key pair by a manufacturer of the destination system device.

In a further embodiment of the method in accordance with the invention, the destination system device comprises a programmable logic controller.

In a still further embodiment of the method in accordance with the invention, the detection of a naming conflict, the expansion of an encrypted software component to include a naming conflict resolution rule, and the resolution of the naming conflict are performed automatically.

It is also an object of the invention to provide a system for naming-conflict-free integration of software components originating from different software component manufacturers, comprising: software development devices of different software component manufacturers which produce software components and encrypt them using their respective cryptographic keys, where, if a naming conflict occurs during integration of encrypted software components, at least one of the encrypted software components for which the naming conflict has occurred is extended to include a naming conflict resolution rule.

The system also includes a transport device configured to transport the encrypted software components, including the encrypted software component extended to include the naming conflict resolution rule, to a destination system device which, upon receipt of the transported encrypted software component, first decrypts the encrypted software and then automatically resolves the naming conflict that has occurred in accordance with the co-transported naming conflict resolution rule.

In an embodiment of the system in accordance with the invention, the transport device comprises a data network.

In a alternative embodiment of the system in accordance with the invention, the transport device comprises a data medium or more specifically a memory.

It is also an object of the invention to provide a destination system device for resolving naming conflicts in software components, having an interface for receiving encrypted software components, where, if at least one received encrypted software component is extended to include a naming conflict resolution rule, the destination system device, after decryption of the encrypted software components, automatically resolves the naming conflict that has arisen using the received naming conflict resolution rule.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments of the method in accordance with the invention and of the system in accordance with the invention will now be explained with reference to the accompanying drawings, in which:

FIG. 1 is a flow chart of the method for resolving a naming conflict in encrypted software components in accordance with an embodiment of the invention, and FIG. 2 is a schematic block diagram of the system for naming-conflict-free integration of software components in accordance with the invention.

DETAILED DESCRIPTION OF THE PREFERRED EMBODIMENTS

As can be seen from FIG. 1, the method for resolving a naming conflict in encrypted software components in accordance with the invention essentially consists of three steps S1, S2, S3.

In a first step S1, an occurrence of a naming conflict in encrypted software components, which may originate from the same but also from different software component manufacturers OEM is identified, i.e., detected. A naming conflict between encrypted software components is detected in particular if the software components have at least one identical name for function calls, constants, variables, data types or other objects of different functions, constants, variables, data types or other objects. For example, if two software components have an identical name in the case of a function call for different functions, a naming conflict exists which is detected in step S1. In an embodiment, this can be detected using unencrypted header data of the respective encrypted software components. In a alternative embodiment, the naming conflict between encrypted software components is detected using tables of the name used in the encrypted software components for software component calls, constants, variables, data types or objects.

As soon as a naming conflict is detected in step S1, one of the encrypted software components in which a naming conflict is detected is extended, in a step S2, to include a naming conflict resolution rule for resolving the naming conflict.

In a step S3, the encrypted software components are then transmitted to a destination system device. Only after transmission does resolution of the naming conflict occur following decryption of the software components on the destination system device in accordance with the co-transmitted conflict resolution rule that is readable in plain text by the destination system device.

Resolution of the naming conflict therefore occurs without the source code of the software component manufacturers OEM being visible to third parties.

To resolve a naming conflict between two encrypted software components, the name causing the naming conflict is replaced by a substitute name in at least one of the two software components after decryption thereof for all the function calls, and accesses using that name that are contained in the software component.

In an embodiment of the method in accordance with the invention, the substitute name is contained in the co-transmitted naming conflict resolution rule. The naming conflict resolution rule is then, for example: Replace "function name" of software component X by "substitute name".

Alternatively, the substitute name can also be generated by the destination system device. The substitute name can be a generated random number or a count value produced by a counter.

The name used for a function call, a constant, a variable, a data type or another object, i.e., data object, can be a string of characters comprising letters and numbers.

In another embodiment of the method in accordance with the invention, the software component SWK developed by a software component manufacturer OEM is encrypted using a hybrid cryptographic method using a public key $K_{pub}$. After transmission from a transmitting device to a receiving device, the encrypted software component ENC-SWK is decrypted at the receive end using a hybrid cryptographic method using a private key $K_{priv}$ which can be incorporated in the destination system device. The private key $K_{priv}$ is preferably stored in a tamper-proof manner in the destination system device. In a possible embodiment of the method, the public key $K_{pub}$ and the private key are generated as a key pair by the destination system device manufacturer, where the destination system device is possibly a programmable logic controller (PLC).

FIG. 2 shows a schematic block diagram representing an embodiment of the system 1 in accordance with the invention for naming-conflict-free integration of software components SWK which can originate from different software component manufacturers OEM. In the exemplary embodiment shown in FIG. 2, two different software component manufacturers $OEM_A$ and $OEM_B$ generate two different software components $SWK_A$ and $SWK_B$, e.g., by a corresponding development tool. Software development devices 2A, 2B encrypt the software components SWK using the respective cryptographic key $K_{OEM}$ of the respective software component manufacturer $OEM_A$, $OEM_B$. The software components SWK can be, for example, programs or subroutines, but also other software elements, such as files. The software components SWK are initially created, i.e., programmed, using a corresponding development tool and are present as source code. To protect the software components SWK from unwanted access by unauthorized third parties, these software components, or more specifically the source code, are encrypted using a cryptographic key $K_{OEMA}$ and $K_{OEMB}$ respectively by an encryption unit within the software development devices 2A, 2B and are then present in encrypted form. In the exemplary embodiment shown in FIG. 2, the two encrypted software components $ENC-SWK_A$ and $ENC-SWK_B$ are then integrated, e.g., by a third software component manufacturer C in a software development device 2C or software integration device. In the case of the exemplary embodiment shown in FIG. 2, the two software component manufacturers $OEM_A$ and $OEM_B$ are, for example, suppliers of another software component manufacturer $OEM_C$. In the device 2C of the third software component manufacturer $OEM_C$, if a naming conflict occurs during integration of the two encrypted software components $ENC\text{-}SWK_A$, $ENC\text{-}SWK_B$, at least one of the two encrypted software components in which the naming conflict occurs is extended to include a naming conflict resolution rule.

After successful extension of one of the two encrypted software components, e.g., of the encrypted software component $ENC\text{-}SWK_B$, the two encrypted software components are transported to a destination system device 4 via a transport device 3, where the transported encrypted software components include the encrypted software component that has been extended to incorporate the naming conflict resolution rule. In the exemplary embodiment shown in FIG. 2, the transport device 3 is a data circuit or data network. In an alternative embodiment, the transport device is a data medium, i.e., a memory. For transmission via a data network, wireline or wireless transmission can be used.

At the receive-end destination system device 4, after receipt of the transported encrypted software components, the encrypted software components are first decrypted and then the naming conflict that has occurred is automatically resolved in accordance with the accompanying naming conflict resolution rule. The software components are then executed. The destination system device 4 can be, for example, a programmable logic controller (PLC).

In the method and system in accordance with the disclosed embodiments of invention, the destination system device 4 receives information about function calls to be replaced to resolve the naming conflict using the co-transported naming conflict resolution rule. The system in accordance with the disclosed embodiments of the invention allows a user to flexibly rename invoked functions of software or rather of software components supplied in encrypted form. This means that the knowhow of the respective software component manufacturer OEM is protected against attacks from third parties despite the existence of a renaming possibility for resolving the naming conflict because, although the user can execute the encrypted software on the software destination system device 4 after decryption on his destination system, he cannot view it in unencrypted form.

The method and system in accordance with the disclosed embodiments of the invention can be used universally for any kind of manufactured software components SWK or software elements. The disclosed embodiments of the method can also be used for multi-stage integration of different software components. In an embodiment, the substitute name for resolving the naming conflict is contained in the co-transmitted naming conflict resolution rule. In a alternative embodiment, the substitute name is generated in the user's destination system device 4. This can be a generated random number, a generated count value or a generated string of characters. The word width of the substitute name can vary or be predefined. In another embodiment, a security check occurs to ascertain whether the substitute name itself triggers a naming conflict. In this case another substitute name is generated, e.g., by means of a random number generator or a counter.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for resolving a naming conflict in encrypted software components, comprising:
   (a) detecting the naming conflict in the encrypted software components during integration of the encrypted software components;
   (b) extending one of the encrypted software components in which the naming conflict occurred to include a naming conflict resolution rule for resolving the naming conflict;
   (c) transmitting the encrypted software components including the extended encrypted software component having the naming conflict resolution rule to a destination system device and decrypting the encrypted software components including the extended encrypted software component having the naming conflict resolution rule to a destination system device on the destination system device;
   (d) resolving, after the step of transmitting, the naming conflict in accordance with the naming conflict resolution rule.

2. The method as claimed in claim 1, wherein the naming conflict between the encrypted software components is detected if the software components include at least one identical name for one of function calls, constants, variables, data types or other objects of different functions, constants, variables, data types or other objects.

3. The method as claimed in claim 2, wherein the naming conflict between the encrypted software components is detected using unencrypted header data of respective ones of the encrypted software components.

4. The method as claimed in claim 2, wherein the naming conflict between the encrypted software components is detected using tables of a name used in the encrypted software components for one of software component calls, constants, variables, data types and objects.

5. The method as claimed in claim 1, wherein the naming conflict between encrypted software components is detected using unencrypted header data of respective ones of the encrypted software components.

6. The method as claimed in claim 1, wherein the naming conflict between the encrypted software components is detected using tables of a name used in the encrypted software components for one of software component calls, constants, variables, data types and objects.

7. The method as claimed in claim 1, wherein the step of resolving comprises replacing a name causing the naming conflict by a substitute name in one of the two software components after decryption thereof for all function calls and accesses using the name causing the naming conflict that are contained in the software component.

8. The method as claimed in claim 7, wherein the substitute name is one of contained in the conflict resolution rule received in the extended encrypted software component and generated in the destination system device.

9. The method as claimed in claim 8, wherein the substitute name comprises one of a generated random number and a count value.

10. The method as claimed in claim 1, wherein a name for a function call, a constant, a variable, a data type or another object of another software component comprises a sequence of characters that include letters and numbers.

11. The method as claimed in claim 1, wherein each the encrypted software component is formed by a developed software component encrypted using a hybrid cryptographic method using a public key.

12. The method as claimed in claim 11, wherein the encrypted software component is decrypted using a hybrid cryptographic method using a private key which is incorporated in the destination system device.

13. The method as claimed in claim 12, wherein the public key and the private key are generated as a key pair by a manufacturer of the destination system device.

14. The method as claimed in claim 13, wherein the destination system device comprises a programmable logic controller.

15. The method as claimed in claim 1, wherein the detection of the naming conflict, the extension of an encrypted software component to include the naming conflict resolution rule, and the resolution of the naming conflict are performed automatically.

16. A system for naming-conflict-free integration of software components originating from software component manufacturers, comprising:
   software development computers of different software component manufacturers, said manufacturers manufacturing software components and encrypting the manufactured software components using respective cryptographic keys, the software development computers detecting a naming conflict in the encrypted software components during integration of the encrypted software components and extending at least one of the encrypted software components in which a naming conflict has occurred to include a naming conflict resolution rule;
   a programmable logic controller; and
   a transporter which transports the encrypted software components including the at least one of the encrypted software components which has been extended to include the naming conflict resolution rule to the programmable logic controller;
   wherein the programmable controller, upon receipt of the transported encrypted software components, initially decrypts the received encrypted software components and automatically resolves the naming conflict which occurred in accordance with the naming conflict resolution.

17. The system as claimed in claim 16, wherein the transporter comprises one of a data network and a data medium.

18. A programmable logic controller encoded to resolve naming conflicts in software components, comprising:
   a processor having memory; and
   an interface for receiving encrypted software components including at least one of the encrypted software components which has been extended to include a naming conflict resolution rule, the extended encrypted software component being extended to include the naming conflict resolution rule in an event of a naming conflict which occurred during integration of the encrypted software components;
   wherein the programmable logic controller decrypts the encrypted software components and automatically resolves the naming conflict which occurred in accordance with the received naming conflict resolution rule.

19. A non-transitory data medium encoded with a computer program executed by a computer that causes a naming conflict in encrypted software components to be resolved the computer program comprising:
   (a) program code for detecting the naming conflict in the encrypted software components during integration of the encrypted software components;
   (b) program code for extending one of the encrypted software components in which the naming conflict occurred to include a naming conflict resolution rule for resolving the naming conflict;
   (c) program code for transmitting the encrypted software components including the extended encrypted software component having the naming conflict resolution rule to a destination system device and decrypting the encrypted software components including the extended encrypted software component having the naming conflict resolution rule to a destination system device on the destination system device; and
   (d) program code for resolving, in the destination system device, the naming conflict in accordance with the naming conflict resolution rule received in the decrypted extended encrypted software component.

* * * * *